United States Patent
Klein et al.

(10) Patent No.: US 6,245,835 B1
(45) Date of Patent: Jun. 12, 2001

(54) POLYMERIC AMINES AND REACTIVE EPOXY POLYMER COMPOSITIONS

(75) Inventors: Dieter H. Klein, Buehl-Neusatz; Hans Juergen Wessely, Achern; Karin C. Joerg, Karlsbad, all of (DE)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/117,007

(22) PCT Filed: Feb. 21, 1997

(86) PCT No.: PCT/US97/02694

§ 371 Date: Nov. 20, 1998

§ 102(e) Date: Nov. 20, 1998

(87) PCT Pub. No.: WO97/31963

PCT Pub. Date: Sep. 4, 1997

(30) Foreign Application Priority Data

Feb. 29, 1996 (GB) .................................................. 9604297

(51) Int. Cl.⁷ .............................. C08K 3/20; C08L 63/02
(52) U.S. Cl. ...................... 523/402; 523/404; 523/414; 523/424
(58) Field of Search .................................... 523/402, 404, 523/414, 424

(56) References Cited

U.S. PATENT DOCUMENTS

| | | |
|---|---|---|
| 2,633,458 | 3/1953 | Shokal . |
| 3,297,519 | 1/1967 | Rambosek . |
| 3,477,990 | 11/1969 | Dante et al. . |
| 3,821,243 | 6/1974 | Habermeier et al. . |
| 3,907,719 | 9/1975 | Habermeier et al. . |
| 3,929,717 | 12/1975 | Lee . |
| 3,975,397 | 8/1976 | Habermeier et al. . |
| 4,071,477 | 1/1978 | Seltzer et al. . |
| 4,289,826 | 9/1981 | Howell, Jr. . |
| 4,315,044 * | 2/1982 | Elmore et al. ...................... 427/386 |
| 4,421,906 * | 12/1983 | Waddill et al. ..................... 528/111 |
| 5,118,729 | 6/1992 | Piechocki . |
| 5,319,004 | 6/1994 | Marten et al. . |
| 5,344,856 | 9/1994 | Klein . |

FOREIGN PATENT DOCUMENTS

| | | |
|---|---|---|
| 44 05 148 C1 | 5/1995 | (DE) . |
| 0 480 379 A2 | 4/1992 | (EP) . |
| 0 617 726 B1 | 10/1994 | (EP) . |
| 1 380 108 | 3/1972 | (GB) . |
| 1 533 825 | 1/1977 | (GB) . |
| 6-179801 | 6/1994 | (JP) . |
| WO 93/12187 | 6/1993 | (WO) . |
| WO 95/01387 | 1/1995 | (WO) . |

OTHER PUBLICATIONS

Kirk–Othmer Encyclpopedia of Chemical Technology, 3ʳᵈ Ed., vol. 9, pp. 267–289.

M. A. Jackson, "Guidelines to formulation fo waterborne epoxy primers; An evaluation of anti–corrosive pigments", Polymers Paint Colour Journal, vol. 180, No. 4270, Oct. 1990, pp. 608–621.

Dr. Jason L. Chou, "Novel corrosion–resistant waterborne epoxy coatings", Polymers Paint Colour Journal, Sep. 7, 1994, pp. 413–417.

H. Lee & K. Neville, "Handbook of Epoxy Resins", McGraw Hill, New York, 1967, (Cover page only).

* cited by examiner

*Primary Examiner*—Robert Dawson
*Assistant Examiner*—D. Aylward

(57) ABSTRACT

An emulsified reactive epoxy polymer composition which is readily dispersed in water particularly suited for use in a coating composition which may be cured at ambient temperatures. The emulsified composition incorporates a hydrophilic polyoxyalkylene segment.

9 Claims, No Drawings

POLYMERIC AMINES AND REACTIVE EPOXY POLYMER COMPOSITIONS

The invention relates to reactive epoxy polymer compositions emulsified in water comprising an emulsified reactive polymer curing composition and a polymeric epoxy emulsion. In another aspect, the invention relates to a process for preparing such water emulsified reactive polymer compositions. In yet another aspect, the invention relates to cured coatings resulting from further reaction of the water emulsified reactive polymer compositions on a suitable substrate.

Two-part epoxy resin based coating systems generally comprise a curable epoxy resin and a curing agent for the epoxy resin, and are commonly dispersed or dissolved in a solvent, primarily an organic solvent, to prepare coating compositions, for example, paints and floor sealants. The use of such organic solvent-based coating compositions is discouraged on environmental grounds. On the other hand, such cured epoxy resin-based coatings provide hard and abrasion resistant coatings which are resistant to, among others, hydrocarbons and aqueous media.

Water-based resin systems consisting of an epoxy resin and a curing agent dissolved or emulsified in water have been developed, and create less environmental and health concerns. The development of such systems is reviewed by Chou (Polymers Paint Colour Journal, Vol. 184, 1994, pp 413–417). Water-based resin systems are described in U.S. Pat. No. 4,289,826, in GB-A-1,533,825, and in GB-A-1,380,108. Known two-part water-based epoxy resin emulsion coating compositions have significant disadvantages as described by Chou. In particular, the deficiencies of amidoamine adducts or modified polyamines which disperse liquid epoxy resin at the point of application is clearly described. These curing agents are normally made water dispersible by salt formation with volatile organic acids. These acids often create odor, flash rusting, and water sensitivity problems. The problems of flash-rusting and corrosion are dealt with in detail by M. A. Jackson, "Guidelines to Formulation of Waterborne Epoxy Primers", Polymers Paint Colour Journal, October 1990, Vol. 180, No 4270, pp 608–621 and by H. Leidheiser, Jr., "Mechanism of Corrosion Inhibition with Special Attention to Inhibitors in Organic Coatings," Journal of Coatings Technology, October 1988, pp. 97–106.

In general, it is difficult to develop stable emulsions which have high solids content and low viscosity, and therefore good flowability. Furthermore, many of the known systems display poor coating properties, as they do not readily coalesce without solvents when coated on a substrate, resulting in cured coatings with poor mechanical flexibility and adhesion, high porosity and excessively high film formation temperature for ambient cure applications. Such systems have a limited balance between hydrophobic and hydrophilic properties, resulting in limited flexibility in the formulation of coatings. Such systems may also suffer from the inability to effectively incorporate pigments into the coating composition. Therefore, pigments are often blended with the curing agent by means of grinding or agitation.

U.S. Pat. No. 5,118,729 describes improved aqueous epoxy dispersions obtained by grafting an emulsifier containing polyoxyethylene residues by reaction on to a terminal epoxy-reactive group of the epoxy molecule prior to dispersion.

U.S. Pat. No. 5,344,856 describes an emulsifiable epoxy resin composition which forms a water stable emulsion comprising the reaction product of a polyepoxide type compound with nominally difunctional $C_{12-36}$ fatty acids, dispersed by means of the addition of a surfactant, wherein the surfactant comprises an alkyl aryloxy poly (propyleneoxy) poly (ethyleneoxy) ethanol or a $C_{12-36}$ hydrocarbyloxy poly (propyleneoxy) poly (ethyleneoxy) ethanol, wherein the hydrocarbyloxy moiety is the residue of a $C_{12-36}$ fatty alcohol or $C_{12-36}$ fatty acid: standard chain-terminating agents may be employed.

U.S. Pat. No. 3,297,519 describes epoxy resins which are self-dispersible in water without further dispersing aids in a concentration up to 10 percent by weight. The resins described are selected glycidyl ethers based on bisphenol-A containing tailored blocks of polyoxyethylene bridging the two bisphenol-A residues in the molecule. These products are used as components of paper finishes.

U.S. Pat. No. 5,319,004 describes water dispersible hardeners for epoxy resins produced from the reaction of specific polyamidoamides with specific polyamines and specific adducts of polyepoxy compounds with polyalkylene polyether polyols.

WO-A-9501387 describes the preparation of self-dispersible curable epoxy compositions prepared by the reaction of an epoxy resin with a polyhydric phenol and an amine-epoxy adduct: the amine-epoxy adduct is a reaction product of an aliphatic polyepoxide and a polyoxyalkylene-amine. The products described are asserted to require a catalyst to promote the amine-epoxy adduct reaction with the polyhydric phenol and epoxy resin, and the dispersion of the self-dispersible, curable epoxy resin is stated to require high shear in specially designed equipment. Specific reaction sequencing is stated to be necessary in order to avoid post-addition of the amine-epoxy adduct to the epoxy resin Such post addition of the amine-epoxy adduct is said to lead to unstable aqueous dispersions.

DE-A-4405148 describes water-dispersible epoxy compositions derived from the reaction of aromatic epoxy resins, bisphenol-A and polyglycidyl ether polyepoxides, which resins may be cured with conventional amine curing agents for aqueous systems. Dispersion of the water dispersible epoxy compositions are stated to require high shear.

JP-A-H6-179801 describes water-based curable epoxy resin compositions prepared from an epoxy resin, a self-emulsifiable active organic amine curing agent and water. Ease of dispersion is obtained by choice of the curing agent. The application of the technology described to epoxy resins with an epoxy equivalent weight of less than 200 is asserted to yield coatings having good leveling and film forming properties. EP-A- EP 0617726 describes a water-miscible or soluble amine-terminated resin useful as a curing agent for water-dispersible epoxy resins which amine-terminated resin is the reaction product of: 1) a polyamine component comprising one or more hydrophilic amine-terminated polyalkylene glycols, and, optionally, one or more hydrophobic polyamines; 2) a polyepoxide derived from a polyalkylene glycol or cycloalkylene glycol, and optionally hydrophobic polyglycidyl ethers, and, optionally, an amine extender having two active amine hydrogen atoms, and reaction products therefrom; 3) optionally a reactive diluent; and 4) optionally a catalyst for the reaction of an amine with an epoxy resin.

Despite the improvements made to date, the formation of stable aqueous dispersions of emulsified reactive polymer compositions, derived from epoxy resins with an epoxy equivalent weight greater than 350 and aqueous dispersed or dispersible curing agents, is generally difficult. Dispersions of such compositions containing no solvent, exhibit a viscosity higher than optimal. In particular, two-component pre-dispersed compositions are desired which cure at low ambient temperature to provide final coatings with good mechanical properties.

It is desirable to provide emulsified-reactive epoxy polymer compositions which can be produced in presently employed industrial reactors. It is also desirable that such reactive epoxy polymer compositions should be stable without addition of acid or a significant quantity of organic solvent, in order to optimize final coating properties. It is further desirable that such reactive epoxy polymer compositions should also accept and disperse the commonly used hydrophobic curing agents, which may be required in certain applications to allow economically attractive low ambient temperature curing while still providing final coatings with excellent mechanical properties.

The present invention provide s a reactive polymer emulsion composition (I) preparable by:

(i) reacting
   a) a polyoxy alkylenediamine (V) and
   b) optionally at least one further amine, with
   c) at least one polyepoxide (II),
   d) at least one polyoxyalkylene glycol diglycidyl ether (III),
   e) optionally a polyhydroxy hydrocarbon (IX), and
   f) optionally an advancement catalyst (XI), to produce an amine-terminated reaction product (VI),
(ii) emulsifying the amine-terminated reaction product (VI) in water to provide an aqueous emulsion (VII) of the amine-terminated reaction product; and
(iv) dispersing or dissolving in the said emulsion (VII) an epoxy-terminated polymeric material to provide a reactive polymer emulsion (I).

The invention also provides a process for preparing a reactive polymer emulsion composition which process comprises:

(i) reacting
   a) a polyoxyalkylenediamine and
   b) optionally at least one further amine, with
   c) at least one polyepoxide,
   d) at least one polyoxyalkylene glycol diglycidyl ether,
   e) optionally a polyhydroxy hydrocarbon, and
   f) optionally an advancement catalyst, to produce an amine-terminated reaction product,
(ii) emulsifying the amine-terminated reaction product in water to provide an aqueous emulsion of the amine-terminated reaction product; and
(iv) dispersing or dissolving in the said emulsion an epoxy-terminated polymeric material to provide a reactive polymer emulsion.

In a further aspect, the invention provides an amine-terminated polymeric amino-epoxy adduct preparable by:

(i) reacting
   a) a polyoxyalkylenediamine and
   b) optionally at least one further amine, with
   c) at least one polyepoxide,
   d) at least one polyoxyalkylene glycol diglycidyl ether,
   e) optionally a polyhydroxy hydrocarbon, and
   f) optionally an advancement catalyst, to produce an amine-terminated polymeric amino-epoxy adduct, and
(ii) emulsifying the amine-terminated reaction product in water to provide an aqueous emulsion of the amine-terminated reaction product.

In a further aspect, the invention is a coating composition comprising the cured product derived by curing the emulsified reactive epoxy polymer composition (I).

The emulsified reactive polymer composition (I) demonstrates good stability, wettability and viscosity characteristics. Furthermore, the coatings prepared from the emulsified reactive epoxy polymer composition (I) demonstrate good adhesion coalescence, flexibility, resiliency and toughness.

The term "emulsion" is used herein to indicate a stable mixture, wherein in the polymeric epoxy emulsion reaction product (VII) or the dispersion of curing agent (XII), the continuous phase is water and the dispersed phase is the emulsified reactive epoxy polymer composition or the curing agent (XII). The term "emulsifiable" as used herein describes matter which is capable of forming a stable oil in water emulsion. The term "emulsified" as used herein indicates matter present in the dispersed phase. The term "stable emulsion" as used herein refers to an emulsion in which the dispersed components do not settle to the bottom and form a solid cake at ambient temperature for a period of six months at 23° C. The term "stable emulsion" as used herein does not exclude compositions in which some settling of particles with time to form a soft deposit which is easily redispersible by agitation occurs. This six months emulsion stability at 23° C. may be simulated in a test where emulsion stability over a four week period at 40° C. is observed.

The term "reactive polymer" is used herein to indicate a polymeric species capable of further chemical reaction by virtue of reactive-functional groups present within the polymer backbone, pendant to the polymer chain or terminal to the polymer chain.

The term "polyepoxide" (II) as used herein indicates a compound which contains, on average, more than one epoxy moiety per molecule. Also included are partially advanced epoxy resins, that is, the reaction product of a polyepoxide and a polyhydroxy hydrocarbon compound wherein the reaction product has an average of more than one unreacted epoxide unit per molecule. Polyepoxides (polyglycidyl ethers of a polyhydroxy hydrocarbon) may be prepared by reacting an epihalohydrin with a polyhydroxy hydrocarbon or a halogenated polyhydroxy hydrocarbon. Such preparation is well known in the art. See Kirk-Othmer Encyclopedia of Chemical Technology 3rd Ed. Vol. 9 pp. 267–289.

The epihalohydrins correspond to Formula 1 wherein:

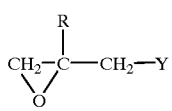

1

Y is a halogen, preferably chloro or bromo, and most preferably chloro;

and R is hydrogen or $C_{1-14}$ alkyl, and more preferably methyl.

The term "polyhydroxy hydrocarbon" (IX) as used herein indicates a compound with a hydrocarbon backbone and on average more than one primary or secondary hydroxy moiety, preferably the average hydroxy moieties per hydrocarbon molecule is two or more. Halogenated polyhydroxy hydrocarbon means herein a polyhydroxy hydrocarbon which is substituted with one or more halogens. The hydroxyl moieties may be bound to aromatic aliphatic or cycloaliphatic moieties. Among preferred classes of polyhydroxy hydrocarbons and halogenated polyhydroxy hydrocarbons are the bisphenols; halogenated bisphenols; hydrogenated bisphenols; and novolac resins, that is, the reaction product of phenols and simple aldehydes, preferably formaldehyde. The reaction product of phenol and an aldehyde, preferably formaldehyde, is a well-known product, as is the process for its production. Such a product is commonly referred to as a novolac resin.

Preferred polyhydroxy hydrocarbons (IX) useful in this invention correspond to Formula 2

wherein:
A is an aryl moiety; aryl moiety substituted with an alkyl or halo moiety; a polyaryl moiety wherein the aryl moieties are connected by direct bonds, alkylene, haloalkylene, cycloalkylene, carbonyl, sulfonyl, sulfinyl, oxygen, or sulfur, such poly aryl moieties being optionally substituted with one or more alkyl or halo moieties; or the oligomeric reaction product of an aldehyde and phenol;
and u is greater than 1. Preferably u is from greater than 1 to 10, even more preferably from greater than 1 to 3, and most preferably, from 1.9 to 2.1.

More preferred polyhydroxy hydrocarbons and halogenated polyhydroxy hydrocarbons include those corresponding to Formulas 3 to 6:

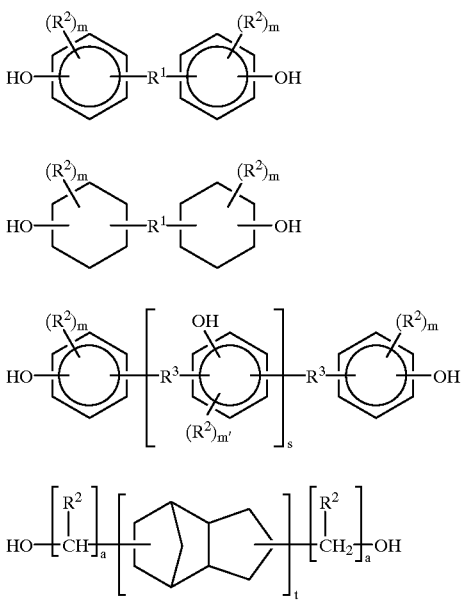

wherein $R^1$ is separately in each occurrence $C_{1-10}$ alkylene, $C_{1-10}$ haloalkylene, $C_{4-10}$ cycloalkylene, carbonyl, sulfonyl, sulfinyl, oxygen, sulfur, a direct bond or a moiety corresponding to Formula 7

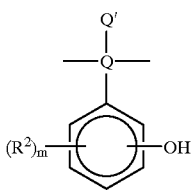

$R^2$ is separately in each occurrence $C_{1-3}$ alkyl or a halogen;
$R^3$ is separately in each occurrence $C_{1-10}$ alkylene or $C_{5-50}$ cycloalkylene;

Q is separately in each occurrence a tetra valent $C_{1-10}$ hydrocarbyl moiety;
Q' is separately in each occurrence hydrogen, cyano, or a $C_{1-14}$ alkyl group;
a is in each occurrence 0 or 1;
m is independently in each occurrence from 0 to 4;
m' is separately in each occurrence from 0 to 3;
s is from 0 to 3; and
t is from 1 to 5.

Even more preferable polyhydroxy hydrocarbons are those represented by Formulas 3, 4 and 5.

$R^1$ is preferably $C_{1-3}$ alkylene, $C_{1-3}$ haloalkylene, carbonyl, sulfur, or a direct bond; more preferably a direct bond, propylene, or fluorinated propylene ($-C(CF_3)_2-$); and most preferably propylene. $R^2$ is preferably methyl, bromo or chloro; and most preferably methyl or bromo. $R^3$ is preferably $C_{1-3}$ alkylene or polycyclic moiety corresponding to Formula 8

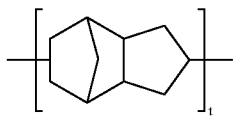

wherein:
t is from 1 to 5 inclusive, preferably from 1 to 3, and most preferably 1. Preferably, m' is from 0 to 2. Preferably, m is from 0 to 2.

Among preferred polyhydroxy hydrocarbons are the dihydroxy phenols. Preferable dihydroxy phenols include those which contain substituents that are non-reactive with the phenolic groups. Illustrative of such phenols are 2,2-bis(3,5-dibromo-4-hydroxyphenyl) propane; 2,2-bis(4-hydroxyphenyl) propane; 2,2-bis(3,5-dichloro-4-hydroxyphenyl) propane; bis(4-hydroxyphenyl) methane; 1,1-bis(4-hydroxyphenyl)-1-phenylethane; 1,1'-bis(2,6-dibromo-3,5-dimethyl-4 hydroxyphenyl) propane; bis(4-hydroxyphenyl) sulfone; bis(4-hydroxyphenyl) sulfide; resorcinol and hydroquinone. The prefer red dihydroxy phenolic compounds are 2,2-bis(4-hydroxyphenyl) propane (bisphenol A), 2,2-bis(4-hydroxyphenyl) methane (bisphenol F) and 2,2-bis(4-hydroxy-3,5-dibromophenyl) propane.

Cycloalkylene a s used herein refers to monocyclic and polycyclic hydrocarbon moieties. As used herein haloalkyl refers to a compound with a carbon chain and one or more of the hydrogens replaced with a halogen. Haloalkyl also means compounds wherein all of the hydrogen atoms have been replaced by halogen atoms. Alkylene as used herein refers to a divalent alkyl moiety.

The polyepoxides useful in the invention preferably correspond to Formula 9

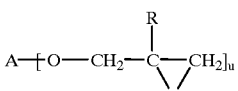

wherein A, u and R are previously defined.

Preferably the polyepoxides are chosen such that the reaction product (VI) is not significantly crosslinked. Such highly crosslinked reaction products form gels and do not form good coatings. Some branching may be present as long as the reaction product (VI) does not form a gel.

The polyepoxides more preferably correspond to one of Formulas 10 to 13.

The polyoxyalkylene glycol diglycidyl ethers (III) correspond to Formula 15

10

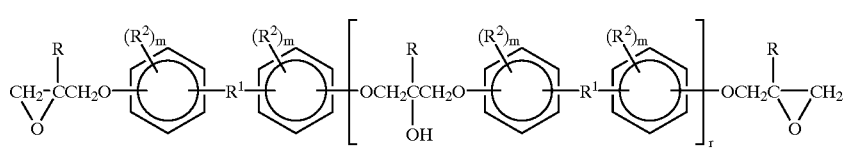

11

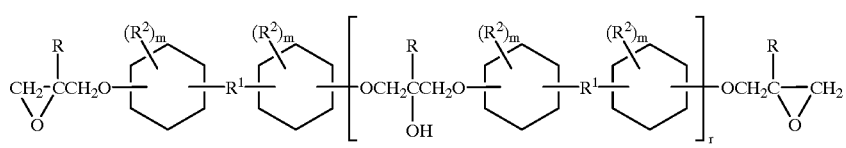

12

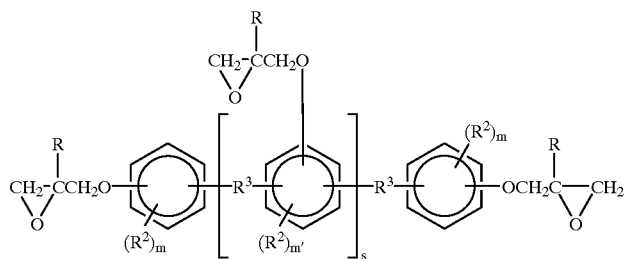

13

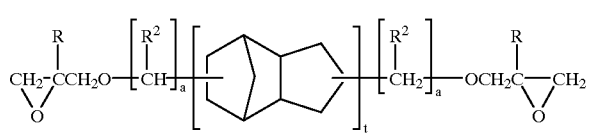

wherein R, $R^1$, $R^2$, $R^3$, a, m, m', s and t are as defined previously, r is from 0 to 40. Preferably, r is from 0 to 10, and most preferably 1 to 5. The symbols, a, m, m', r, s, and t may represent an average number, as the compounds to which they refer are generally found as a mixture of compounds with a distribution of the units to which the symbols refer.

If a polyepoxide corresponding to Formula 12 is used in the preparation of reaction product (VI), then s should be chosen such that the reaction product is not crosslinked to a stage that gel formation occurs. Preferably, s is from 0 to 2.

Polyoxyalkylene glycol diglycidyl ether (III) as used herein refers to a compound or a mixture of compounds which contains, on average, more than one epoxy moiety per molecule, and which may be prepared by reacting an epihalohydrin corresponding to Formula (1) with one or more polyhydroxy compounds or halogenated polyhydroxy compounds corresponding to Formula (14)

14

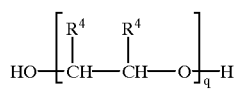

where $R^4$ is separately in each occurrence hydrogen, methyl, halomethyl, or ethyl, with a proviso that if one $R^4$ on an alkoxy unit is ethyl the other must be hydrogen;

and q is a positive real number of 1 to 400. Preferably, q is a positive real number between 20 and 350, more preferably between 40 and 300. The symbol q represents an average number, as the compounds to which it refers are generally found as a mixture of compounds with a distribution of units to which q refers.

15

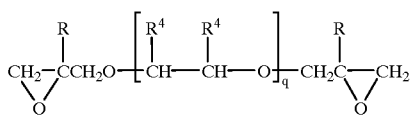

wherein R, $R^4$ and q are as defined previously.

In reaction product (VI) the polyepoxide (II) used preferably corresponds to Formulas 10, 11, or 12, and the polyoxyalkylene glycol diglycidyl ether (III) corresponds to the Formula 15. In another preferred embodiment the polyepoxide (II) used in reaction product (VI) is from 85 to 99.5 percent by weight of polyepoxides corresponding to Formulas 10, 11, and 12, and 0.5 to 15 percent by weight of the polyoxyalkylene glycol diglycidyl ether (III) corresponding to Formula 15. In a more preferred embodiment 85 to 99.5 percent of the polyepoxide used in reaction product (VI) corresponds to Formula 10 and 0.5 to 15 percent of the polyoxyalkylene glycol diglycidyl ethers (III) corresponds to Formula 15.

The amine composition (V) is present in sufficient quantity such that in combination with the polyoxyalkylene glycol diglycidyl ether (III) the polymeric epoxy reaction product (I) has sufficient hydrophilic-lipophilic balance that the polymeric epoxy reaction product (I) is water dispersible. Hydrophilic (poly)amines or hydrophobic (poly) amines may be present in the amine composition. The polyoxyalkylene diamine (V) is a polyalkylene glycol terminated with primary or secondary amine moieties. The polyalkylene glycol chains useful herein can comprise units derived from $C_{2-8}$ oxides, or $C_{2-8}$ glycols, including for example: ethylene oxide, propylene oxide, butylene oxide, ethylene glycol, propylene glycol, butylene glycol, a butane diol (such as 1,4-butane diol), tetrahydrofuran, a propane diol (such as 1,2- or 1,3-propane diol) or a mixture thereof. Preferably the polyoxyalkylene glycol chain is comprised of units derived from ethylene oxide, propylene oxide, a mixture of ethylene oxide and propylene oxide, or tetrahydrofuran and more preferably of units derived from ethylene oxide or a mixture of units derived from ethylene oxide and propylene oxide. In those embodiments where the polyoxyalkylene glycol chain contains a mixture of units from different alkylene oxides, the arrangement of the different alkylene oxide units may be random or in blocks of the same alkylene oxide. The polyoxyalkylene diamine requires sufficient alkylene oxide derived units so that polyoxyalkylene diamine and hydrophilic polyepoxides present render the final amine terminated resin water soluble or miscible. Preferably the polyoxyalkylene diamine has an average molecular weight of from 200 to 4000, and more preferably of from 300 to 3000. Preferably the polyoxyalkylene diamine useful in the invention corresponds to the Formula 16

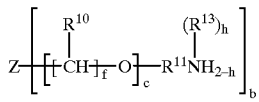

wherein:
$R^{10}$ is independently in each occurrence hydrogen, methyl or ethyl;
$R^{11}$ is independently in each occurrence a $C_{1-10}$ straight- or branched-chain alkylene, $C_{1-10}$ straight- or branched-chain alkenylene, or a $C_{5-12}$ divalent cycloaliphatic moiety;
$R^{13}$ is independently in each occurrence a $C_{1-10}$ straight- or branched-chain alkyl moiety or hydrogen;
Z is independently in each occurrence oxygen or

X is independently in each occurrence a straight- or branched-chain $C_{1-6}$ alkyl moiety;
c is independently in each occurrence 1 or greater;
b is independently in each occurrence 2 or 3;
f is independently in each occurrence from 2 to 4; and
h is independently in each occurrence 0 or 1;
with the proviso that for each

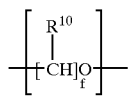

unit if f is 2 and one $R^{10}$ is ethyl, then the other $R^{10}$ must be hydrogen, and if f is 3 or 4, $R^{10}$ is hydrogen.
Preferably Z is oxygen. Preferably X is a $C_{2-4}$ alkylene moiety. Preferably $R^{10}$ is hydrogen or methyl and more preferably hydrogen. Preferably $R^{11}$ is a $C_{1-10}$ straight- or branched-chain alkylene moiety and more preferably a $C_{2-4}$ alkylene moiety. Preferably c is from 2 to 6 and more preferably from 2.6 to 3. Preferably b is 2. Preferably h is 0.
Such polyoxyalkylene diamines are well known in the art. Examples of preferred polyoxyalkylene diamines are the polyamines available from Texaco Chemical Company (Houston, Tex. USA) under the trade name JEFFAMINE, for example, JEFFAMINE D 400, JEFFAMINE D 2000.

The additional amines which may optionally or alternatively be present include amines containing at least one primary or secondary amine moiety which are capable of reacting with an epoxy resin. Preferably the such polyamines correspond to Formulas 17 or 18

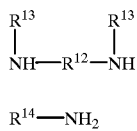

wherein $R^{13}$ is previously defined, $R^{12}$ is independently in each occurrence cyclohexyl, substituted cyclohexyl, heterocyclic or a $C_{1-50}$ so hydrocarbylene moiety, which may be substituted with a non-interfering substituent and which may contain one or more secondary amines, ether, amine or thioether moieties in the backbone. $R^{12}$ is preferably cyclohexyl, substituted cyclohexyl, heterocyclic or a $C_{2-8}$ hydrocarbylene moiety, optionally containing amide or secondary amino moieties in the backbone. $R^{13}$ is preferably hydrogen or a $C_{1-4}$ straight- or branched-chain alkylene moiety. In Formula 16, $R^{13}$ is most preferably hydrogen. In Formula 18, $R^{14}$ is preferably a $C_{1-25}$ linear, branched, alicyclic or polyalicyclic moiety. Examples of preferred amines include cyclic diamines such as isophorone diamine.

These polyamines are included in the composition in sufficient amounts to enhance the final mechanical properties of the coatings prepared upon cure. Attention to the hydrophobicity of the $R^{12}$, $R^{13}$, $R^{14}$ substituents is necessary, otherwise they may overwhelm the hydrophilic character of the amine group(s), and other hydrophilic emulsifying moieties. The final resin may not be sufficiently emulsifiable in water.

Aqueous epoxy functional polymeric emulsion (VII) as used herein refers to a dispersion of epoxy-terminated molecules as particles in water in the size range typified as an emulsion prepared as described in this invention. In general, it is preferable to produce resin emulsions with small droplet diameters of a median value of about 1.5 micrometers. Usually a distribution of droplet diameters is obtained for the polymeric epoxy emulsion particles of from 0.8 to 7.0 micrometers. Some settlement may occur on prolonged standing or when the emulsions are highly dilute. This settlement is easily reversible by thorough stirring at low shear, for example, hand stirring is sufficient for up to 20 liters. Additionally, epoxy functional species which are soluble or dispersible in the aqueous amine functional polymeric amino-epoxy adduct emulsion (VI) may be employed.

The polyhydroxy hydrocarbon (IX) means herein a compound with a hydrocarbon backbone and on average more than one primary or secondary hydroxy moiety, preferably two or more. Halogenated polyhydroxy hydrocarbon means herein a polyhydroxy hydrocarbon which is substituted with one or more halogens. The hydroxyl moieties may be bound to aromatic aliphatic or cycloaliphatic moieties. Among preferred classes of polyhydroxy hydrocarbons and halogenated polyhydroxy hydrocarbons are the bisphenols; halogenated bisphenols; hydrogenated bisphenols; novolac resins, that is, the reaction product of phenols and simple aldehydes, preferably formaldehyde; and polyalkylene glycols. The reaction product of phenol and an aidehyde, preferably formaldehyde, is a well-known product, as is the process for its production. Such a product is commonly referred to as a novolac resin.

Optionally, the emulsifiable composition comprising reaction product (VI) may further comprise a protic solvent (X), present in sufficient amounts to stabilize the emulsion in water. Optionally, such solvent is present in amounts of up to 10 weight parts, more preferably 0 to 5 weight, and most preferably from 0 to 1.5 weight parts of solvent per 100 weight parts of reaction product (VI). Preferred protic solvents (X) include glycols based on alkylene glycols, and ethers thereof, alkyl or hydroxyalkyl-substituted benzenes, lower alkanols, γ-butyrolactone, γ-caprolactone and n-methyl pyrrolidone. The preferred alkylene glycols are those based on ethylene, propylene, and butylene oxide. The glycol ethers are alkyl ethers of such glycols. Preferred glycols are those based on propylene oxide and butylene oxide, with preferred glycol ethers being $C_{1-4}$ alkyl ethers of propylene and butylene glycols. The most preferred glycol ethers are the $C_{1-4}$ alkyl ethers of propylene glycol. Examples of the preferred solvents are methyl ether of propylene glycol, benzyl alcohol, isopropyl alcohol, butyrolactone, γ-caprolactone, n-methyl pyrrolidone, and xylene.

Catalysts (XI) which may be employed to facilitate the preparation of reaction product (VI) by advancement of the polyepoxide compound with the one or more polyhydroxy hydrocarbons are those known to those skilled in the art for the reaction of epoxy moieties with active hydrogen-containing compounds. Examples of useful catalysts include zinc carboxylate, organozinc chelate compound, trialkyl aluminum, quaternary phosphonium and ammonium salts, tertiary amines and imidazole compounds. The catalyst is generally employed in an amount of from 0.01 to 2; preferably 0.02 to 1, most preferably 0.02 to 0.1, weight percent based on the combined weight of the polyepoxide compound (II) and the optional polyhydroxy hydrocarbons (IX) used.

Sufficient aqueous amine functional polymeric amino-epoxy adduct emulsion (VI) is contacted with aqueous epoxy functional polymeric emulsion (VII) to cure the resin. The epoxy resin composition of this invention is contacted with sufficient curing agents to cure the resin. Preferably the ratio of (epoxy glycidyl ether) equivalents to equivalents of curing agent is from 0.5:1 and 2:1; more preferably 0.6:1.4 to 1.4:0.6; even more preferably 0.8:1.2 to 1.2:0.8 and most preferably 0.9:1.1 to 1.1:0.9.

The emulsions of this invention may include pigments, dyes, stabilizers, plasticizer's and other conventional additives. Preferably the formulation dispersion or emulsion in water has a solids level of from 40 to 80 percent, and most preferably from 50 to 70.

When used to form a coating, the emulsified reactive polymer compositions of this invention are contacted with a substrate. Water and any cosolvents used are then evaporated off to leave a coating. The coating will cure at ambient conditions in several days. Elevated temperatures may be used to speed up the cure of the coating composition. Such curing conditions are well known to those skilled in the art. The coating composition may be contacted with the substrate by any means known in the art including spraying, pouring or roller-coating the formulation.

Insofar as epoxy advancement reactions are carried out in order to produce an advanced polyepoxide, procedures for performing such reactions well known in the art are used; see "The Handbook of Epoxy Resins," H. Lee and K. Neville (1967), McGraw Hill, New York and U.S. Pat. Nos. 2,633,458; 3,477,990; 3,821,243; 3,907,719; 3,975,397; and 4,071,477. Common catalysts for epoxy advancement reactions, and common chain regulators and chain terminators well known in the art may be employed.

In producing coating formulations, the use of pigments, slip additives, fillers, dispersing aids, defoamers, leveling agents, air release agents and other additives commonly applied in the industry have been applied.

Emulsion Quality

The quality of an applied and cured emulsified two-component epoxy binder system depends greatly on the quality of the emulsion, particularly on the droplet size and distribution. Emulsion quality particularly influences the film formation, drying time, water resistance, gloss, pigment binding capacity, yield, flexibility, adhesion and hardness.

Compared with conventional solvent systems, water dispersed formulations tend to foam more when they are produced and when they are applied. This undesirable build-up of foam may result from the impact of mechanical energy during emulsification procedures particularly when the process is not run under vacuum. Foam can lead to blemishes in appearance such as pitting, bubbles, and fish-eyes. The non-ionic emulsifiers in the experimental formulations were selected also for their ability to furnish low foam emulsions. However, additives such as BYK 023 (Byk Chemie, Wesel, Germany) antifoaming agent, may be added to the formulation prior to pigmentation. Defoamer should be added in a concentration of 0.04 to 0.5 percent.

Flocculation or aggregation of resin droplets can cause uneven and matted surfaces. The droplet size of the emulsion has a variable influence on different properties of the film.

Properties like gloss, water-resistance, stability and pigment-binding, seem to suffer with increased droplet particle size while drying time, hold-out and brush ability improves with increased droplet particle size. Clearly a balance of properties is sought.

In general it is preferable to produce emulsions with small droplet diameters of a medium value of about 1.5 micrometers. Usually a distribution of droplet diameter is obtained for the experimental emulsions of 0.8 and 7 micrometers. However, some settlement might occur on prolonged standing and when the emulsions are highly diluted. Therefore, thorough stirring of the emulsion is necessary before taking fractional amounts out of the container to avoid inconsistencies due to concentration differences.

In one embodiment, this invention provides, as an aqueous dispersion, a blend of an aqueous amine-functional polymeric amino-epoxy adduct emulsion and an aqueously dispersed epoxy-functional composition.

In one version of this embodiment, this invention provides, as an aqueous dispersion, an amine-functional polymeric amino-epoxy adduct composition comprising the reaction product of from 15 to 60 parts by weight, preferably 20 to 50 parts by weight, more preferably 25 to 45 parts by weight of one or more aromatic polyepoxides of average molecular weight greater than 250, from 5 to 50 parts by weight, preferably 7.5 to 45 parts by weight, more preferably to 10 to 35 parts by weight of one or more polyoxypropylene diglycidyl ethers having an average molecular weight of 250 to 10,000, from 5 to 60 parts by weight, preferably from 15 to 50 parts by weight, more preferably from 20 to 45 parts by weight of one or more polyoxyalkylenediamines and from 10 to 90 parts by weight, preferably from 30 to 70 parts by weight, more preferably from 35 to 65 parts by weight of water, this adduct emulsion having an amino hydrogen equivalent weight (AHEW) of from 100 to 700, preferably from 200 to 500, more preferably from 300 to 400. A further embodiment is a blend of this amino-epoxy adduct emulsion with an aqueous epoxy-terminated emulsion, which blend is a physically stable reactive emulsion: the mole ratio of amine terminated amino-epoxy adduct to aqueous epoxy terminated emulsion in the final product is from 0.8:1.0 to 1.0 to 0.8, preferably from 0.9:1.0 to 1.0:0.9.

In this embodiment the reactants are mixed over a period of from 10 to 180 minutes, preferably 15 to 150 minutes, at a temperature of between 50° C. and 150° C., preferably 75° C. to 120° C., without agitation and in the presence of a nitrogen blanket. During addition a controlled exotherm will occur. Agitation of the reaction content at a temperature of between 50° C. and 150° C., preferably 75° C. to 120° C., for a further period of 10 to 180 minutes, preferably 15 to 150 minutes after the exotherm has peaked, followed by cooling and emulsification in water to a solids content of 35 to 65 percent, preferably 40 to 60 percent, provides a stable amine-terminated polymeric amino-epoxy emulsion with particle size average below 1000 Angstrom.

In a further embodiment a polyepoxide of epoxy equivalent weight (EEW) of between 350 and 1200, preferably between 400 and 1000, is prepared as described in the art by advancement of a liquid epoxy resin with a polyphenol in the presence of a suitable catalyst. The partially advanced polyepoxide is cooled to between 700° C. and 130° C., preferably between 80° C. and 120° C., and utilized as one of the reactants for synthesis of the amine-terminated polymeric amino-epoxy emulsion described above.

In a further embodiment, minor quantities by weight of hydrophilic or hydrophobic (poly)amines are blended with polyoxyalkylenediamines and further reacted as described above.

Further embodiments are cured coatings derived from the ambient cure of the aqueous emulsified reactive polymer compositions. The stable aminic-terminated polymeric amino-epoxy adduct emulsion and an aqueously dispersed epoxy-terminated composition provide a stable emulsified reactive polymer composition, which, upon cure at a temperature between 5° C. and 35° C., preferably between 10° C. and 30° C., for a period of between 5 and 75 hours, preferably between 10 and 50 hours, at a relative humidity of between 10 and 100 percent, preferably of between 25 and 95 percent, provides a glossy cured film exhibiting good cure properties, good Pendulum Hardness resistance and good chemical resistance.

Clear coating formulations and pigmented formulated formulations were produced using methods common in the industry and well known to those skilled in the art.

The test methods used in evaluating cure characteristics and coating properties are also common in the industry and well known to those skilled in the art. The specific test methods used are now referred to or described.

Pigmented Formulations

For the pigmented coating studies described in this invention a variety of paint was produced.

In order to avoid an over effective dispersing a rather low agitator speed of 2500 rpm were selected for the Dispermat FT (VMA Getzmann, Reichshof, Germany). First the curing agent and pigments were mixed at 2500 rpm for 5 minutes. To the pigment paste glass beads of 2 mm diameter had been added so that the pigment paste to glass bead weight ratio was 1:1. Then milling was carried out under water cooling for 25 minutes at 2500 rpm. After the milling water and defoamer had been added to the mill base, the pigmented mixture was allowed to be stirred for another 5 minutes at 1000 rpm. Grindometer readings were taken from the pigment paste both after milling, and also on the following day in order to reconfirm the values. In some cases, air bubbles contained in the paste prevented an immediate measurement. The average particle size of the pigment paste was ca. 10 micrometers.

Coating Application

Coatings were either drawn down with an Erichsen applicator (Erichsen, Hemer-Sundwig, Germany) or air-sprayed to a predetermined film thickness of 50 to 60 micrometers in a one-coat application for physical tests (curing rate, gloss, and flexibility). All chemical resistance tests were conducted on one coat applications of ca. 90 micrometers dry film thickness.

Substrates

Three substrates were employed in the testing.

1. Sand blasted cold-rolled steel with a 40 micrometer peak to valley profile for salt spray resistance. This was conducted on two coat applications. Buildup on each coat was approximately 50 to 60 micrometers thick and 1 day was allowed between coats for curing at ambient conditions.

2. Bonder steel 26–60–0C(190mm ×105 mm ×0.75 mm)for physical tests.

3. Glass plates to follow gloss and transparency during potlife and film formation.

Curing Conditions Used for the Studies

Test panels were allowed to cure at ambient conditions (23° C./45 to 55 percent RH) on the following schedule prior to testing:

1. Physical properties—7 days

2. Resistance properties—three weeks (minimum) exceptions to these conditions and schedules are obvious and noted in the data tables.

3. Cure under adverse conditions examines curing characteristics at 10° C. and at very high humidity of ca. 80 percent RH (relative humidity). In this case panels are examined after removal from the test environment to determine any lasting adverse effects like flash rusting.

Physical Tests

Through Film Drying Time (TFDT)

Through film drying time is a measure of the various stages and rates of film formation in the drying or curing of organic coatings for the purpose of comparing types of coatings or ingredient changes, or both. The procedure followed is in principle covered by ASTM D1640-83, however here an Erichsen drying time recorder (Model 509, Erichsen, Hemer-Sundwig, Germany) is used. This is a recorder which pulls a needle with a constant speed over a glass bar on which a coating has been drawn.

Methyl Ethyl Ketone (MEK) Resistance/Double Rubs

This test monitors the resistance of a coating against MEK in the initial phase of cure as a function of the time elapsed after application. Coatings are prepared on steel and after the coating is tack free, the dry film thickness of the system to be tested and a reference system is determined. The dry film thickness should differ by not more than 10 percent. The actual test is then performed as follows. The flat end of a 500 g hammer is covered with a piece of cotton-wool. The cotton-wool is soaked with MEK and a hammer is brought to one side of the panel. The hammer is moved back and forth over the whole coating, being one double rub. Care has to be taken not to put any additional pressure on the hammer. After every double rubs the cotton-wool is re-soaked with MEK. The procedure is repeated until the coating is rubbed off to such an extent that the panel becomes visible or other defects occur. This test is repeated daily until the application withstands 100 double rubs without visible effect. The difference in MEK double rub development gives an indication of the rate at which crosslinking is achieved.

Gloss

Readings are made using a gloss meter (Type L, Dr. Lange, Berlin, Germany) and measured at 20 degree, 60 degree and 80 degree angles of reflection.

Pendulum Hardness Development

This test method uses a pendulum damping tester as a measure of the rate of cure by means of hardness development of organic coatings that have been applied to acceptable plane rigid surfaces. The test follows the proposal by ASTM D4366-84 method B: "Hardness of organic coatings by pendulum (Persoz) damping test."

Sudden Impact Resistance

Impact tests were conducted using a Gardner Heavy-Duty Variable Impact Tester. Reverse (substrate between the impacter and the test coating) and direct (impacter applied to coating) impact tests were conducted. Results are reported as the force (Joules) necessary to cause failure (cracking) of the film; therefore, the higher the reading—the more flexible the film.

Film Thickness

This test is performed following the guide-lines by ASTM D1186-81; "Non-destructive measurement of dry film thickness of nonmagnetic coatings applied to ferrous base."

Adhesion

The cross-cut test is a simple empirical test to determine the adhesion of a one- or more-coat system on its substrate as well as the intercoat adhesion. This test was performed in accordance with ASTM D3359-83: "Measuring adhesion by tape test," method B. This method covers a procedure for assessing the adhesion of coating films to metallic substrates by applying and removing tape over cuts made in the film. In the examples described in this report TESAPACK 4124 tape is used.

Resistance Against Slow Deformation/Erichsen Indentation

This empirical test gives an indication about the resistance of a coating system against cracking and/or loss of adhesion due to deformation of the substrate. The test is performed in accordance with DIN/ISO 1520 of February 1982: "Tiefungspruefung."

Chemical Resistance

This test gives a quick indication about the chemical resistance and are to be used on a relative basis only.

A piece of cotton-wool of approximately 1 cm diameter is saturated with the chemical against which the coating has to be tested. The chemicals for this purpose were: deionized water, ethanol, xylene, toluene, gasoline, aqueous sodium hydroxide solution (10 percent weight.), aqueous acetic acid solution (10 percent weight), aqueous hydrochloric acid solution (10 percent weight) and aqueous sulfuric acid solution (10 percent weight). The cotton-wool is covered with a glass lid of 50 mm diameter and a height of 30 mm which is sealed with silicon grease to the coating. Hourly or daily the appearance of the coating is judged by means of determining the degree of blistering, and discoloration,. The test is performed for one week. The results of blistering and visual surface test like color changes or softening have been monitored and rated on a scale of 0 (poorest) to 10 (best).

Salt Spray

Tests were conducted in a salt-fog cabinet saturated with a fog from a 5 percent salt solution. Test temperature was 55° C. The panel was inscribed with the Greek letter lambda through to the substrate. Panels were examined after 500, 750 and 1000 hours exposure. Failure to protect the substrate is indicated by severe blistering or creepage from the scribe in excess of 6 mm.

Humidity Resistance

Tests were conducted in a 40° C. and 100 percent humidity cabinet.

Examinations occurred after 550, 750 and 1000 hours exposure times. Failure to protect the substrate, was indicated by blistering.

The following examples are included for illustrative purposes and are not intended to limit the scope of claims herein. All parts and percentages stated herein are by weight, unless otherwise indicated.

EXAMPLE 1

A one litre, five-neck round-bottom glass reactor equipped with a nitrogen inlet, water cooled condenser and metal anchor design agitator driven by an electric motor was used. A 250 mL dropping funnel was employed. Temperature control was provided by a thermocouple, heating mantle and temperature controller.

Diglycidyl ether of bisphenol-A having an epoxy equivalent weight (EEW) of 180 (A, 230 g), a polyglycidyl ether of a phenolic novolac with a functionality of 3.6 and an EEW of 178 (B, 100 g), a polyoxyalkylene diglycidyl ether having an epoxy equivalent weight of 5450 and an ethylene oxide/propylene oxide mole ratio of 5:1 (C, 60 g) and bisphenol-A (D, 42.5 g) were charged into the reactor and heated within 30 minutes to 80° C. under a nitrogen blanket. Agitation was applied, the mixture was heated to 90° C., and ethyltriphenyl-phosphonium acid acetate 70 percent active in methanol (E, 0.6 g) was added under agitation. The mixture was heated to 115° C. whereupon an exothermic reaction ensued which peaked at ca. 165° C. The reaction mixture was then further heated at 145° C. for 1.5 hours to yield an advanced epoxy resin with an epoxy equivalent weight of 288.

This resin was cooled to 100° C. and a polyoxypropylenediamine with a molecular weight of 2000 (Jeffamine™ 2000, Texaco Chemical Company, Houston, Tex., F, 62.5 g) was added under agitation. The reaction mixture was allowed to react at between 92° C. and 95° C. for one hour.

Water (500.0 g) was continuously added over one hour with agitation while maintaining a temperature of at least 70° C., and the resulting emulsion stirred at 60° C. for one hour before cooling to below 30° C. and bottling.

The resulting emulsion (Example 1) had a solids content of 50 percent, a viscosity of 2000 to 8000 mpa.s at 23° C. and an EEW of ca. 718.

EXAMPLE 2

A reaction sequence, reactants and equipment similar to those used in Example 1 were employed. Diglycidyl ether of Bisphenol-A having an epoxy equivalent weight (EEW) of 180 (A, 141.6 g), bisphenol-A (B, 44.5 g), a polyoxyalkylene diglycidyl-ether having an epoxy equivalent weight of 5450 and an ethylene oxide/propylene oxide mole ratio of 5:1 (C, 64.7 9), p-tert-butyl phenol (D, 7.6 9) and methoxypropanol (E, 4.2 g) were charged into the reactor and heated within 30 minutes to 80° C. under a nitrogen blanket. Agitation was applied, the mixture was heated to 90° C., and ethyltriphenylphosphonium acid acetate 70 percent active in methanol (F, 0.4 g) was added under agitation. The mixture was heated to 115° C. whereupon an exothermic reaction ensued which peaked at ca. 140° C. The reaction mixture was then further heated at 145° C. for 2 hours to yield an advanced epoxy resin with an epoxy equivalent weight of 760.

This resin was cooled to 90° C. and polyoxypropylenediamine with a molecular weight of 400 (Jeffamine 400/Texaco Chemical Company, G, 163.6 g) and isophorone diamine (H, 67.4 g) added under agitation. All heating was switched off, and the reaction contents cooled to about 70° C. before an exothermic reaction took place which peaked out at 860° C. The reaction mixture was heated slowly to 120° C. over 45 minutes, maintained at this temperature for 1.5 hours and cooled to 99° C. over 15 minutes.

Water (404.0 g) was continuously added over 35 minutes with agitation while maintaining a temperature of at least 650° C., and the resulting emulsion stirred at 60° C. for 30 minutes before cooling to below 300° C. and bottling.

The resulting emulsion had a solids content of 55 percent, a viscosity of ca. 5000 mPa.s at 23° C., an amino hydrogen equivalent weight (AHEW) of ca. 315 and a pH of 11.4.

The polymeric amino-functional emulsion prepared as described above (267.7 g) was blended with the polymeric epoxy-functional emulsion prepared as described in Example 1 (618.1 g), tris-2,4,6-dimethylaminomethylphenol (Ancamine K54/Anchor Chemical, 13.9 g) and water (100.3 g) to yield a water emulsified reactive epoxy polymer composition with a solids content of 50 percent and a viscosity of 4500 mPa.s at 23° C. The stoichiometric ratio of epoxy to amine hydrogen groups in the blend is 1:1.

This water-emulsified reactive epoxy polymer composition described above was cured at room temperature to give clear coatings: the characteristics of these clear coatings as a function of cure time are shown in Table I.

TABLE 1

Clear Coat Performance Properties

| FEATURE | VALUE |
|---|---|
| I) Wet varnish | |
| Potlife [h] | 1.5 |
| Through film drying time (TFDT) [h] | –8 |
| II) Dry film (on Bonder 26-60-0C) | |
| Film Thickness [μm] | 57 |
| Persoz hardness [s] | |
| 1 d RT cure | 60 |
| 7 d RT cure | 159 |
| Film appearance | Sl. Hazy |
| Cross-hatch adhesion [% remain] 1 d | 100 |
| Erichsen indentation [mm] 7 d RT cure | 9 |
| Resistance to water-spotting 1 d RT cure | good |
| Resistance to MEK rubs 1 d RT cure | 100 |

The formulation used to produce pigmented coatings from the amine and epoxy-terminated components described in this example to yield a water-emulsified pigmented reactive epoxy polymer composition are shown in Table II. Properties of the pigmented coating after cure at 10° C. and 23° C. are shown in Table III and corrosion resistance figures for the coating formed after cure for 7 days at 23° C. are shown in Table IV.

TABLE II

Paint Formulation 2

| PROCEDURE/INGREDIENTS | WEIGHT |
|---|---|
| Mix under agitation | |
| Amine-Terminated Emulsion from Example 2 | 124.77 |
| Catalyst Ancamine K54 (Anchor Chemicals Ltd.) | 8.76 |
| Finntitan RR2 (Titanium dioxide) | 112.77 |
| Sicor ZNP/S (Zinc phosphate) | 112.77 |
| Blanc fix N (Barium sulfate) | 112.77 |
| Bayferrox 130 M (Iron oxide, red) | 7.90 |
| Bayferrox 920 (Iron oxide, yellow) | 7.90 |
| Demineralized water | 65.32 |
| Byk 033 (Defoamer) | 2.22 |
| Disperse on a horizontal pearl mill under cooling (<40° C.) to < 10 μm | |
| Add under agitation | |
| Terminated Emulsion from Example 1 | 287.92 |
| Demineralized Water | 156.90 |
| Add demineralized water for required application viscosity Parameters | 1000.00 |
| Solids content: | 57.6 |
| Pigment/binder ratio: | 1:0.7 (solids) |
| PVC (Pigment Volume Concentration) | 30% |

TABLE III

Water-borne Paint Cured Coatings Properties
(Cure at 10° C./80% Relative Humidity and at 23%)

GENERAL PROPERTIES

| | 10° C. | 23° C. |
|---|---|---|
| Cure temperature | | |
| Pigment volume concentration of point [%] | 30 | 30 |
| Coating thickness [μm] | ca. 55 | ca. 55 |
| Drying time, tack-free [h] | | 2.5 |
| Gloss 20°/60°/80° 1 d RT cure | 3/22/50 | 1/6/27 |
| MEK resistance [DR] 1. d RT cure | >100 | 80 |
| Pendulum hardness according to Persoz [s] | 76 | 137 |
| Cross-cut adhesion tape test percent remaining 1 d RT cure | 100 | 100 |
| Erichsen indentation [mm] | | |
| 7. d RT cure | 3.9 | 3.5 |
| 14. d RT cure | | 3.4 |

TABLE IV

Corrosion Resistance

| PROPERTIES | VALUE |
|---|---|
| Humidity ASTMD 4885-86A 7 days constant at 55° C. blisters [10 = best] | 5 |
| Adhesion after 24 h recovery at 23° C./50% RH tape, remain [%] | 99 |
| Salt spray - ASTM (B-117-73)* [H] | 500 |
| Scripe creep [mm] | 0 |
| Scripe blisters [10 = best] | 4 |
| Surface blisters [10 = best] | 4 |
| Surface corrosion | none |

EXAMPLE 3

A reaction sequence, reactants and equipment similar to those used in Example 1 were employed. Diglycidyl ether of Bisphenol-A having an epoxy equivalent weight (EEW) of 180 (A, 141.6 g), bisphenol-A (B, 44.5 g), a polyoxyalkylene diglycidyl ether having an epoxy equivalent weight of 5450 and an ethylene oxide/propylene oxide mole ratio of 5:1 (C, 64.7 g), p-tert-butyl phenol (D, 7.6 g) and methoxypropanol (E, 4.2 g) were charged into the reactor and heated within 30 minutes to 80° C. under a nitrogen blanket. Agitation was applied, the mixture was heated to 90° C., and ethyltriphenylphosphonium acid acetate 70 percent active in methanol (F, 0.4 g) was added under agitation. The mixture was heated to 115° C. whereupon an exothermic reaction ensued which peaked at ca. 140° C. The reaction mixture was then further heated at 145° C. for 2 hours to yield an advanced epoxy resin with an epoxy equivalent weight of 760.

This resin was cooled to 90° C. and polyoxypropylenediamine with a molecular weight of 400 (Jeffamine 400 available from Texaco Chemical Company, G, 118.5 g) and polyoxypropylenediamine with a molecular weight of 240 (Jeffamine 240 available from Texaco Chemical Company, G. 118.5 g) added under agitation. All heating was switched off, and the reaction contents cooled to about 70° C. before an exothermic reaction took place which peaked out at 90° C. The reaction mixture was heated slowly to 120° C. over 45 minutes, maintained at this temperature for 1.5 hours and cooled to 99° C. over 15 minutes.

Water (409.0 g) was continuously added over 35 minutes with agitation while maintaining a temperature of at least 65° C., and the resulting emulsion stirred at 60° C. for 30 minutes before cooling to below 30° C. and bottling.

The resulting emulsion had a solids content of 55 percent, a viscosity of ca. 3900 mPa.s at 23° C., an amino hydrogen equivalent weight (AHEW) of ca. 327 and a pH of 11.4.

The polymeric amino-functional emulsion (AHEW 327, 32.7 g) prepared as described above and 28 g of the epoxy-terminated emulsion produced by blending a polyglycidyl ether of bisphenol-A (Epoxy Equivalent Weight {EEW} 186, 75 parts by weight), a polyglycidyl ether of bisphenol-F (Epoxy Equivalent Weight {EEW} 168, 25 parts by weight) and a nonyl phenol alkoxylate (Tensiofix DW900 available from OMNICHEM, Louvain-la-Neuve, BELGIUM, 3 parts by weight) were thoroughly mixed (stoichiometric 1:1 ratio), tris-2,4,6-dimethylaminomethylphenol (Ancamine K54/Anchor Chemicals, 0.7 g) was added and the mixture thoroughly homogenized by stirring under low shear.

Films were cast from this blend on Bonder 26 60 0C steel panels using a 200 micrometer draw down bar and cured for 24 hours at 23° C. and 55 percent relative humidity. The resultant coating exhibited high gloss, a Persoz Pendulum Hardness of 72 seconds and an impact resistance of 160 in. lb. (front and rear).

EXAMPLE 4

Polyglycidyl ether of Bisphenol-A having an epoxy equivalent weight (EEW) of 510 (A, 225 g) and a polyoxyalkylene diglycidyl ether having an epoxy equivalent weight of 5450 and an ethylene oxide/propylene oxide mole ratio of 5:1 (B, 75 g) were charged into the reactor and heated within 30 minutes to 110° C. under a nitrogen blanket. Agitation was applied after the mixture was molten and the mixture stirred at 110° C. for 30 minutes to ensure a homogeneous mixture is formed. The source of heat was removed. Polyoxypropylene diamine (JEFFAMINE™D400 from Texaco Chemical Company, AHEW 100, 200 g) were added under agitation. The temperature of the reactor contents dropped to 90° C. before an exothermic reaction set in which peaked at 125° C. after 15 minutes. No external cooling was applied. The reaction mixture was heated and held under agitation at 125° C. for 90 minutes before cooling to 95° C. Water (600 g) was added continuously over 90 minutes while maintaining the temperature between 75° C. and 85° C. A viscous emulsion is obtained which cannot be stirred if the temperature is allowed to fall below 60° C. After dilution with water to a solids level of 35 percent, the resulting emulsion had a fine particle size of below 1000 Angstrom, an AHEW of ca. 925 and a viscosity of ca. 20,000 mPa.s at 23° C.

The polymeric amino functional emulsion (AHEW 925, 92.5 g) prepared as described above and 280 g of the epoxy-terminated emulsion produced by blending a polyglycidyl ether of Bisphenol-A (Epoxy Equivalent Weight {EEW} 240, 87 parts by weight), propylene glycol monomethyl ether (DOWANOL™ PM available from The Dow Chemical Company, 10 parts by weight) and a nonyl phenol alkoxylate (Tensiofix DW900 available from OMNICHEM, 3 parts by weight) were thoroughly mixed (stoichiometric 1:1 ratio), and the mixture thoroughly homogenized by stirring under low shear.

Films were cast from this blend on Bonder 26 60 0C steel panels using a 200 micrometer draw down bar. The coatings become glossy and tack free after curing for 24 hours at 10° C. and 80 percent relative humidity. After curing at 23° C. for 24 hours the glossy, cured coating withstands 100 MEK double rubs and exhibits a Persoz Hardness Value of 120 seconds (Pendulum Hardness).

EXAMPLE 5

A reaction sequence, reactants and equipment similar to those used in Example 1 were employed. Isophorone diamine (A, 24.6 g), a polyoxyalkylene diglycidyl ether having an epoxy equivalent weight of 5450 and an ethylene oxide/propylene oxide mole ratio of 5:1 (B, 10.0 g), a polyoxypropylene diamine with a molecular weight of 2000 (Jeffamine 2000 available from Texaco Chemical Company, C, 16.0 g) and triethylene glycol diamine (Jeffamine EDR 148 available from Texaco Chemical Company, 9.0 g) were charged into the reactor and heated within 30 minutes to 95° C. under a nitrogen blanket. At this time, the polyoxyalkylene diglycidyl ether having an epoxy equivalent weight of 5450 had dissolved in the mixture and agitation was applied. The reaction mixture was held at 95° C. for 15 minutes, and the diglycidyl ether of bisphenol-A having an epoxy equivalent weight (EEW) of 180 (E, 40.4 g) was added under agitation at an addition rate which maintained the temperature at 95° C.

The mixture was maintained at 95° C. for an additional 30 minutes and water (100.0 g) was continuously added over with agitation while maintaining a temperature of between 55° C. and 80° C. A stable oil-in-water emulsion was formed, which was allowed to cool down during one hour under agitation to 45° C. and then bottled.

The resulting emulsion had a solids content of 50 percent and an AHEW of 320.

EXAMPLE 6

A reaction sequence, reactants and equipment similar to those used in Example 1 were employed. Isophorone diamine (A, 22.7 g), a polyoxyalkylene diglycidyl ether having an epoxy equivalent weight of 5450 and an ethylene oxideipropylene oxide mole ratio of 5:1 (B, 10.0 g) and a polyoxypropylenediamine with a molecular weight of 400 (Jeffamine 400/Texaco Chemical Company, C, 30.0 g) were charged into the reactor and heated within 30 minutes to 95° C. under a nitrogen blanket. At this time the polyoxyalkylene diglycidyl ether having an epoxy equivalent weight of 5450 had dissolved in the mixture and agitation was applied.

The reaction mixture is held at 95° C. for 15 minutes, and the diglycidyl ether of Bisphenol-A having an epoxy equivalent weight (EEW) of 180 (E, 37.3 g) was added under agitation at an addition rate which maintains the temperature at 95° C.

The mixture was maintained at 95° C. for an additional 30 minutes and water (100.0 g) was continuously added over with agitation while maintaining a temperature of between 55° C. and 80° C. A stable oil-in-water emulsion was formed, which was allowed to cool down during one hour under agitation to 45° C. and then bottled.

The resulting emulsion had a solids content of 50 percent and an AHEW of 320.

EXAMPLE 7

A reaction sequence, reactants and equipment similar to those used in Example 1 were employed. Polyglycidyl ether of Bisphenol-A having an epoxy equivalent weight (EEW) of 510 (A, 116 g) and a polyoxyproylene glycol diglycidyl ether having an epoxy equivalent weight of 281 (B, 60.25 g) were charged into the reactor and heated within 30 minutes to 97° C. under a nitrogen blanket. Agitation was applied after A was molten and the mixture stirred at 97° C. for 15 minutes to ensure a homogeneous mixture is formed. The source of heat was removed. Triethyleneglycoldiamine (JEFFAMINE EDR 148 from TEXACO CHEMICAL COMPANY, Amino Hydrogen Equivalent Weight (AHEW) 37.5, 86.8 g) and polyoxypropylene diamine (JEFFAMINE D230 from TEXACO CHEMICAL COMPANY, AHEW 57.5, 86.8 g) were added under agitation. The temperature of the reactor contents dropped to 72° C. before an exothermic reaction set in which peaked at 120° C. after 15 minutes. No external cooling was applied. The reaction mixture was held under agitation at 115° C. for 45 minutes before an additional amount of polyoxyproylene glycol diglycidyl ether having an epoxy equivalent weight of 281 (B, 80.4 g) was added over 30 minutes while maintaining the temperature between 115° C. and 125° C. The reaction mixture was held at 120° C. for an additional two hours before cooling to 35° C. Water (430 g) was added continuously over a one hour period. The resulting mixture had a solids content of ca. 50 percent, a fine particle size of below 1000 Angstrom, and an AHEW of ca. 280.

The polymeric amino-functional emulsion (AHEW 280, 28 g) prepared as described above, and 47 g of the epoxy-terminated emulsion produced by blending a polyglycidyl ether of bisphenol-A (Epoxy Equivalent Weight {EEW} 240, 87 parts by weight), propylene glycol monomethyl ether (DOWANOL PM available from The Dow Chemical, 10 parts by weight) and a nonyl phenol alkoxylate (Tensiofix DW900 available from OMNICHEM, 3 parts by weight) were thoroughly mixed (stoichiometric 1:1 ratio), and the mixture thoroughly homogenized by stirring under low shear.

Films were cast from this blend on Bonder 26 60 0C steel panels using a 200 micrometer draw down bar. The coatings became glossy and tack free after curing for 24 hours at 10° C. and 80 percent relative humidity. After curing at 23° C. for 24 hours, the glossy, cured coating withstood 100 MEK double rubs and exhibited a Persoz Hardness Value of 120S (Pendulum Hardness).

Liquid aromatic epoxy resins, for example, the diglycidyl ether of Bisphenol-A having an epoxy equivalent weight (EEW) of 186 was easily emulsified in a 1:1 epoxy/amine stoichiometric ratio into an emulsion of the polymeric amino-functional emulsion described above, without additional emulsifier. The resultant water emulsified reactive epoxy polymer compositions furnished hard and glossy films if cured at temperatures of 10° C. or higher. The effective pot life of such systems was ca. 3 hours.

Comparative Example 8

A reaction sequence, reactants and equipment similar to those used in Example 1 were employed. Isophorone diamine (A, 26.5 g), triethylene glycol diamine (Jeffamine EDR 148fTEXACO CHEMICAL COMPANY, B, 9.0 g) and a polyoxypropylenediamine with a molecular weight of 2000 (Jeffamine 2000/TEXACO CHEMICAL COMPANY, C, 16.0 g) were charged into the reactor and heated within 30 minutes to 95° C. under a nitrogen blanket. Agitation was applied. The reaction mixture was held at 95° C. for 15 minutes, and the diglycidyl ether of bisphenol-A having an epoxy equivalent weight (EEW) of 180 (E, 48.5 g) was added under agitation at an addition rate which maintained the temperature at 95° C.

The mixture was maintained at 95° C. for an additional 30 minutes and water (100.0 g) addition was attempted. Shortly after the water addition was started, a separate layer of water formed, and further addition of water was stopped. Increase or decrease of temperature, changes in agitation speed and further addition of water failed to produce an emulsion.

Comparative Example 9

Isophorone diamine (26 g) was added to a three-necked glass flask equipped with a thermometer, an agitator and a condenser, and the contents were thoroughly agitated while maintaining a temperature of between 40° C. to 500° C. A polyglycidyl ether, having an epoxy equivalent weight of 1980 obtained from one mole of propylene oxide/ethylene oxide random polymer type polyether polyol PR-3009 (Asahi Denka Kogyo K.K.) having a molecular weight of 3000 and ethylene oxide content of 85 percent by weight and 2.2 moles of epichlorohydrin, (13 g) and the hydrophobic epoxy compound EP-4901 (EEW 182, Asahi Denka Kogyo K.K., 12 g) 30 were added slowly while checking heat generation. The reaction was allowed to take place over two hours at 90° C. Water (13 g) was added to obtain the self-emulsifying activated curing agent.

Adeka resin EP-4200, (Asahi Denka Kogyo K.K., EEW 190, (10 g) the self emulsifying activated curing agent (7 g) and water (10 g) were mixed and cured. The film performance was tested to give the following results. Film condition after 24 hours was "good'" pencil hardness was "H'" water resistance after 7 days of soaking was "good" and adhesion (mortar board checkerboard test) was 100/100.

Comparative Example 10

Preparation of Amine-epoxide Adduct (66 percent Capped)

Into a one-liter reaction flask equipped with a stirrer, heating mantle, nitrogen line, cooling condenser, and thermometer was charged 485 grams (0.4 equivalents) Jeffamine 2000 (Texaco Chemical Company, Houston, Tex.) and 142.2 grams (0.61 equivalents) of polyepoxide of propoxylated (5PO) pentaerythritol (Henkel Corporation, Ambler, Pa.). The reaction mixture was heated slowly to 125° C. ° to 130° C. with stirring and held at this temperature for about 2.5 hours. The reaction mixture was then cooled to 70° C. and analyzed for epoxide and amine content. The product amine polyepoxide adduct had 0.4 meq/gm of total amine and 0.33 meq/gm of epoxide which indicated that about 66 percent of the initial free epoxide groups had been reacted with the amine.

Preparation of Self-Dispersing Resin

Into a 250 mL reaction flask equipped with a heating mantle, nitrogen line, cooling condenser, thermometer and stirring means was charged 66.4 grams (0.348 equivalents) of the diglycidyl ether of bisphenol A, and 19.6 grams (0.172 equivalents) of bisphenol A. The reactants were heated to 95° C. and then 12.0 grams (0.004 equivalents) of the amine-epoxide adduct prepared above was added with 0.15 grams triphenyl phosphine. The reaction mixture is heated slowly to 150° C. with stirring whereupon an exothermic reaction is observed. Cooling is immediately applied to maintain the reaction temperature between 150° C. and 160° C. After the exothermic reaction subsides, the reaction mixture is maintained at 160° C. for an additional hour followed by a 15 minute period at 190° C. The reaction mixture is then cooled to 160° C. and 14 grams of propyl Cellosolve™(trademark of Union Carbide Corporation) is added which immediately begins refluxing. The reaction mixture is cooled to 100° C. and analyzed. The resultant self-dispersing resin, present at 87.5 percent solids in propyl Cellosolve™, has 0.07 meq/gm total amine and an epoxide equivalent weight of 552 based on resin solids.

Preparation of Water-Borne Dispersion

Into a 500 mL reaction flask equipped with a stirrer, heating mantle, nitrogen line, cooling condenser and thermometer was charged 112 grams of the self-dispersing resin (SDR) as prepared above. The resin was heated to 100° C. whereupon 16.5 grams of water were added gradually with stirring over a minute period while the temperature dropped to about 55° C. Then an additional 48 grams of water was added as the temperature was brought to 70° C. over 20 minutes. At 70° C. there was added 2 grams of water followed by stirring for twenty minutes and then by 3 grams of water. The resulting water in oil dispersion is stirred for 45 minutes while it cooled to 45° C., and thereafter is in the form of an oil in water dispersion. After the inversion was completed, 2.0 grams of $C_{5-10}$ alcohol mono-glycidyl ether from CVC Specialty Chemicals Corp. was added as a reactive diluent. Then 36.3 grams water is added at 50° C. over a one hour period. The resulting water-borne dispersion contained 56 percent resin solids in water/propyl Cellosolve™ (82/18) solvent.

Preparation of Coating Composition

Into a 25 mL plastic cup was charged 12.4 gm (56 percent solids) of the water-borne dispersion prepared as above followed by an equal equivalent amount (2 gm) of epoxy curing agent available as 8290 by HiTech (a modified diethylene triamine with a hydrogen equivalent weight of 163). Sufficient water was then added to bring the mixture to a spreadable consistency. The epoxy dispersion/curing agent blend was aged for 10 minutes then a film casting was produced by drawing the blend down on a pre-sanded TRU COLD cold rolled steel panel (3×6×0.32 inches) using a #34 wire-wound steel rod. The film was tack free after 45 minutes. The physical properties of the coating composition which were rated "PASS" were measured after the film had air dried at room temperature for 28 days.

What is claimed is:

1. A reactive polymer emulsion composition preparable by:
   (i) reacting
      a) a polyoxyalkylenediamine and
      b) optionally at least one further amine, with
      c) at least one polyepoxide,
      d) at least one polyoxyalkylene glycol diglycidyl ether,
      e) optionally a polyhydroxy hydrocarbon, and
      f) optionally an advancement catalyst, to produce an amine-terminated reaction product,
   (ii) emulsifying the amine-terminated reaction product in water to provide an aqueous emulsion of the amine-terminated reaction product and
   (iii) dispersing or dissolving in the said emulsion an epoxy-terminated polymeric material to provide a reactive polymer emulsion.

2. A reactive polymer emulsion as claimed in claim 1, wherein the epoxy-terminated polymeric material is an epoxy terminated epoxy-amine adduct.

3. A reactive polymer emulsion as claimed in claim 1 or claim 2, wherein the said polyhydroxy hydrocarbon and the said an advancement catalyst are employed.

4. A reactive polymer emulsion as claimed in any one of the preceding claims, which further comprises a protic solvent in an amount not exceeding 1.5 percent by weight.

5. A reactive polymer emulsion as claimed in any one of the preceding claims, wherein the said at least one further amine includes a monofunctional amine, a polyamine, or a mixture of two or more thereof.

6. A process for preparing a reactive polymer emulsion composition which process comprises:
   (i) reacting
      a) a polyoxyalkylenediamine and
      b) optionally at least one further amine, with
      c) at least one polyepoxide,
      d) at least one polyoxyalkylene glycol diglycidyl ether,
      e) optionally a polyhydroxy hydrocarbon, and
      f) optionally an advancement catalyst, to produce an amine-terminated reaction product,
   (ii) emulsifying the amine-terminated reaction product in water to provide an aqueous emulsion of the amine-terminated reaction product and
   (iii) dispersing or dissolving in the said emulsion an epoxy-terminated polymeric material to provide a reactive polymer emulsion.

7. A process as claimed in claim 6, wherein the polyhydroxy hydrocarbon is a polyhydroxy phenol.

8. A process as claimed in claim 6 or claim 7, wherein the curing agent is added continuously to the polymeric epoxy emulsion reaction product.

9. A coating which comprises a composition as claimed in any one of claims 1 to 5 which has been cured.

* * * * *